(12) United States Patent
Honda

(10) Patent No.: US 6,912,086 B2
(45) Date of Patent: Jun. 28, 2005

(54) PROJECTION DEVICE AND LARGE-SCREEN DISPLAY APPARATUS USING THE SAME

(75) Inventor: Kouichi Honda, Kanagawa-ken (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 10/366,359

(22) Filed: Feb. 14, 2003

(65) Prior Publication Data

US 2003/0156264 A1 Aug. 21, 2003

(30) Foreign Application Priority Data

Feb. 15, 2002 (JP) ..................................... P2002-038896

(51) Int. Cl.⁷ ........................ G03B 21/56; G03B 21/60; G03B 21/22; G03B 21/14; H04N 5/64
(52) U.S. Cl. ........................ 359/449; 359/443; 359/450; 359/453; 359/457; 359/460; 348/787; 348/789; 353/74; 353/97; 353/119
(58) Field of Search ........................ 359/443, 449–450, 359/453, 455–457, 460; 348/787, 789, 794, 836; 353/74, 97, 119

(56) References Cited

U.S. PATENT DOCUMENTS

| | | | |
|---|---|---|---|
| 3,705,757 A | * 12/1972 | Huber | 359/453 |
| 4,921,330 A | * 5/1990 | Takahashi et al. | 359/457 |
| 5,074,644 A | 12/1991 | Hirai et al. | 359/455 |
| 5,299,017 A | 3/1994 | Furuno | 348/786 |
| 5,580,145 A | * 12/1996 | Yamada et al. | 353/74 |
| 5,699,131 A | * 12/1997 | Aoki et al. | 348/832 |
| 5,831,585 A | * 11/1998 | Aoki et al. | 345/32 |
| 6,519,085 B2 | * 2/2003 | Brandt | 359/449 |
| 2002/0181098 A1 | * 12/2002 | Utsumi et al. | 359/443 |

FOREIGN PATENT DOCUMENTS

| | | |
|---|---|---|
| EP | 0 567 330 A2 | 4/1993 |
| EP | 0 758 757 A1 | 2/1997 |
| JP | 2000-162709 | 6/2000 |

* cited by examiner

Primary Examiner—Rodney Fuller
Assistant Examiner—Magda Cruz
(74) Attorney, Agent, or Firm—Pillsbury Winthrop, LLP

(57) ABSTRACT

The invention provides a projection device comprising a screen constituted in a layered structure with a light-transmissive screen panel and a light-transmissive reinforcing panel, wherein a front panel in the screen has a plane wider than residual panels on the back of the screen, an image projector for projecting an image on the screen, a screen frame fit on the peripheral edges of the residual back panels with a plane smaller than the front panel, a double-side adhesive tape inserted between residual back panels and the screen frame for uniting them together, a single-side adhesive tape applied across the peripheral edges of the front panel and the screen frame for uniting them together, and a housing for accommodating therein the image projector and for holding at its opening the screen via the screen frame so as that the front panel of the screen exposes outside.

8 Claims, 7 Drawing Sheets

PROJECTION DEVICE AND LARGE-SCREEN DISPLAY APPARATUS USING THE SAME

CROSS-REFERENCE TO RELATED APPLICATION

The present invention is based upon and claims the benefit of priority from the prior Japanese Patent Application JP2002-38896 filed on Feb. 15, 2002, the entire content of which is incorporated herein by reference.

FIELD OF THE INVENTION

The present invention relates to a projection device having a screen frame for holding a screen of the projection device, and a large-screen display apparatus comprising such projection devices.

BACKGROUND OF THE INVENTION

Projection devices are conventionally provided with a screen for displaying images projected thereto from backward (hereinafter the term of "image" means "character" as well as "image"). The screen is provided with a screen panel comprised of a Fresnel lens and a lenticular lens, and a reinforcing panel. The reinforcing panel is put on the screen panel for increasing the mechanical strength of the screen. On the other hand, there have been considered ways of making joints of screens smaller in a multi-screen display apparatus wherein such projection devices are stacked in a matrix array. For example, Japanese Laid-open Patent Application JP 2000-162709-A discloses such a multi-screen display apparatus. While, FIGS. 8a, 8b duplicate a back projection type projector 50, i.e., a unit device of the multi-screen display apparatus. FIG. 8 is an external perspective appearance of the back projection type projector. FIG. 9 is a section taken along Line A—A of FIG. 8.

The conventional projection device 50, as shown in FIGS. 8 and 9, has a light-transmissive screen 51, a support 52 supporting the backside of the screen 51, and an image projector 53 for projecting images towards the back of the screen 51. And the single-side adhesive tape 54 is applied to the four peripheries of the screen 51 so that the lenticular lens 55, the Fresnel lens 56, and the reinforcing panel 57 of the screen 51 are united together.

In the conventional projection device 50, the single-side adhesive tape 54 has united the reinforcing panel 57 with a relatively large thickness and a considerably heavy weight to a support 52 along with the lenticular lens 55 and the Fresnel lens 56. Therefore, the single-side adhesive tape 54 easily wrinkles and peels off from the screen. As a result, there is a problem that the screen 51 is easy to come off from the support 52.

SUMMARY OF THE INVENTION

In view of the problems, an object of the present invention is to provide a projection device and a large-screen display apparatus, which are able to reduce such a wrinkle and a peeling-off of the adhesive tape uniting a screen to support members, and thus preventing a coming-off of the screen from the support members.

In order to achieve the above objects, a projection device according to one aspect of the present invention is provided with a screen constituted in a layered structure with a light-transmissive screen panel and a light-transmissive reinforcing panel, wherein a front panel in the screen has a plane wider than residual panels in the screen, an image projector for projecting an image on the screen, a screen frame fit on the peripheral edges of the residual panels each having a plane narrower than the front panel, a double-side adhesive tape sandwiched between the peripheral surfaces of the residual panels and the inner surface of the screen frame for uniting them together, a single-side adhesive tape applied across the peripheral edge of the front panel and the outer surface of the screen frame for uniting them together, and a housing for accommodating therein the image projector and also for holding at its opening the screen via the screen frame so as that the front panel of the screen exposes outside.

The phrase "so as that the front panel of the screen exposes outside" means that the screen is visible in front of the projection device. The screen may protrude outward the projection device or may be kept in the projection device.

According to above aspect of the projection device, the periphery of the back panel having a narrow plane is united to the inner surface of the screen frame by the double-side adhesive tape. On the other hand, the periphery of the front panel having a wide plane is united to the outer surface of the screen frame by the single-side adhesive tape. Thereby, the screen is securely held by the screen frame. As a result, a burden of the single-side adhesive tape 5 for holding the screen 2 is alleviated. Therefore, a wrinkle and a peeling-off of the single-side adhesive tape 5 become hard to occur, and thus the screen 2 is reliably held by the screen frame 3. Moreover, when the projection devices are stacked, the joint of the screens is minimized in thickness.

Moreover, a large-screen display apparatus according to another aspect of the present invention, comprises a multi-screen projection apparatus having a matrix-array stack of the projection devices as defined in the above aspect of the invention, an image signal generator for generating image signals to be displayed on a screen of the multi-screen projection apparatus and an image signal processor for dividing the image signal generated by the image signal generator so as that the divided image signals are applied to a plurality of the projection devices.

According to the large-screen display apparatus, the single-side adhesive tape is also applied across the periphery of the front panel of the screen and the outer surface of the screen frame. Therefore, joints of screens in a matrix-array stack of the projection devices become hard to be visible. Therefore, the large-screen display apparatus can display a comfortable image.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention will be described in detail with reference to the attached drawings, FIGS. 1 through 7.

Figure 1:
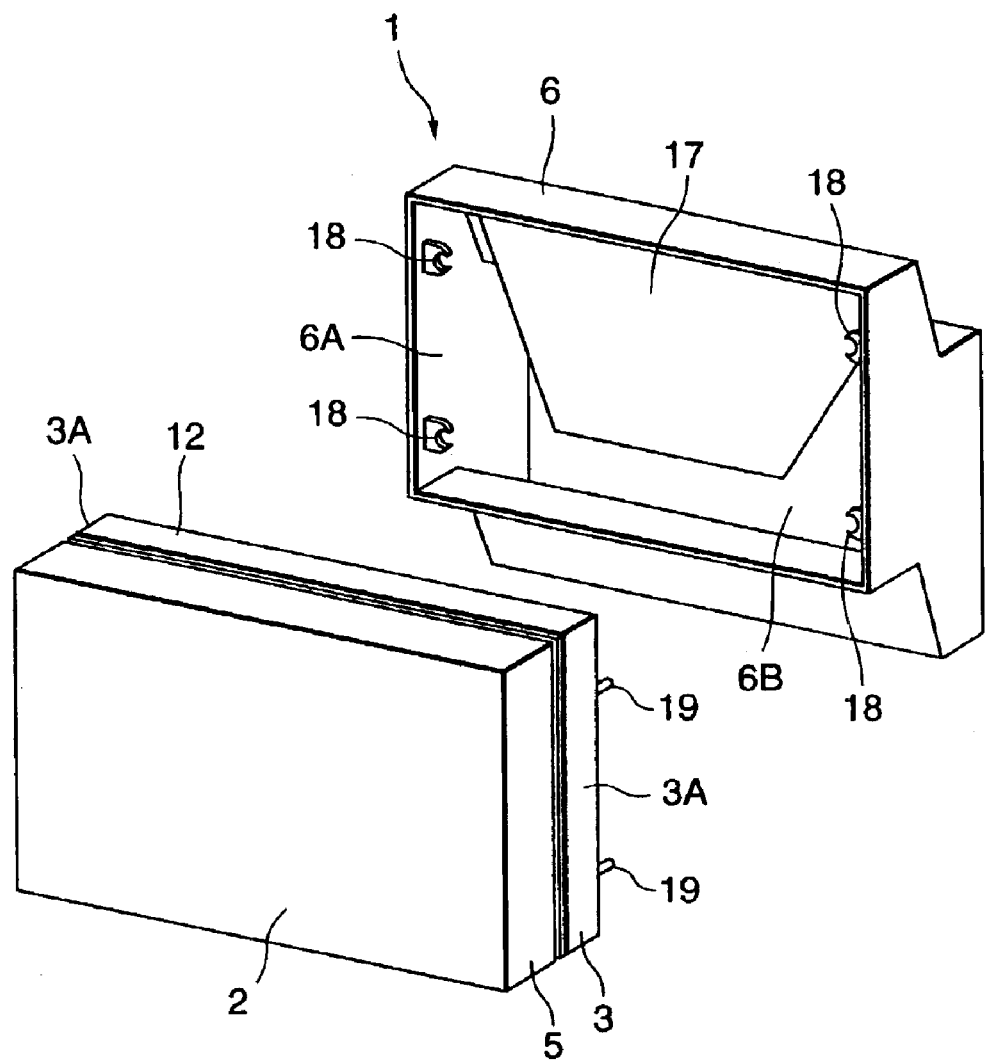
FIG. 1 is an exploded perspective view showing the projection device according to the present invention.
Figure 2:
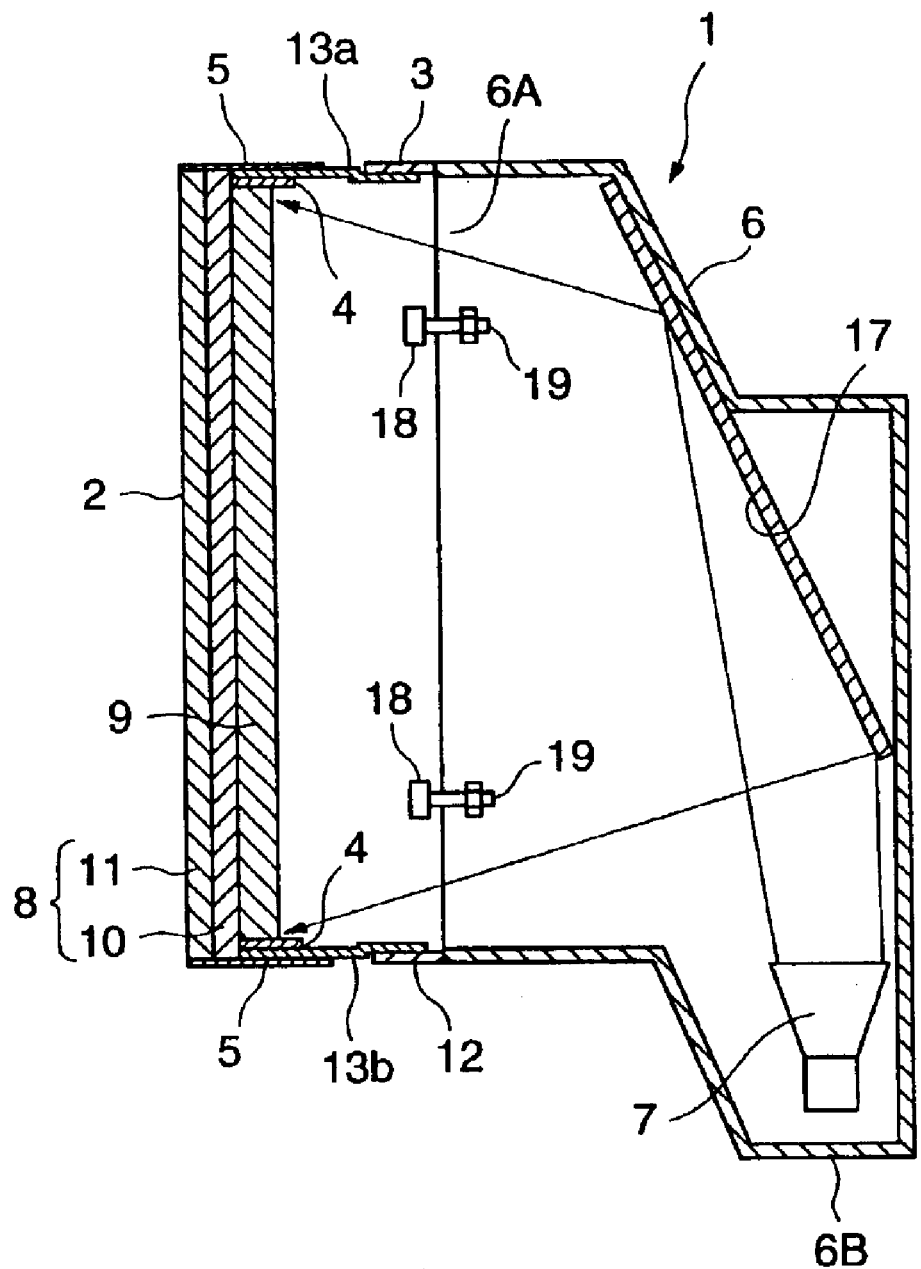
FIG. 2 is a side section showing the projection device according to the present invention.
Figure 3:
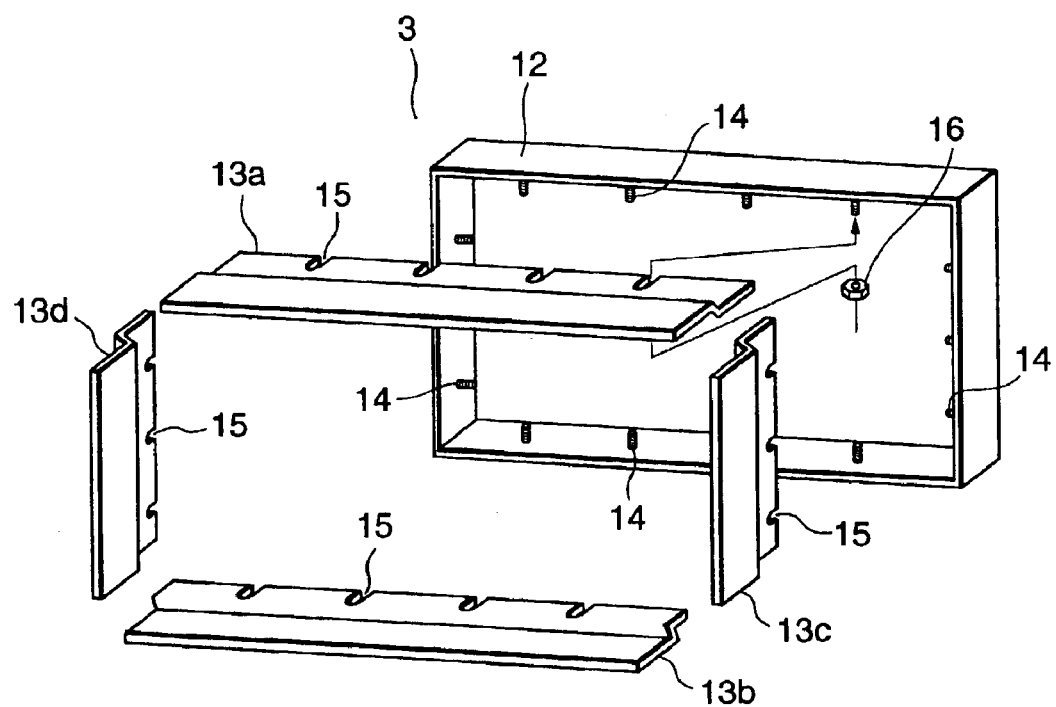
FIG. 3 is a perspective view showing a screen frame of the projection device according to the present invention.
Figure 4:
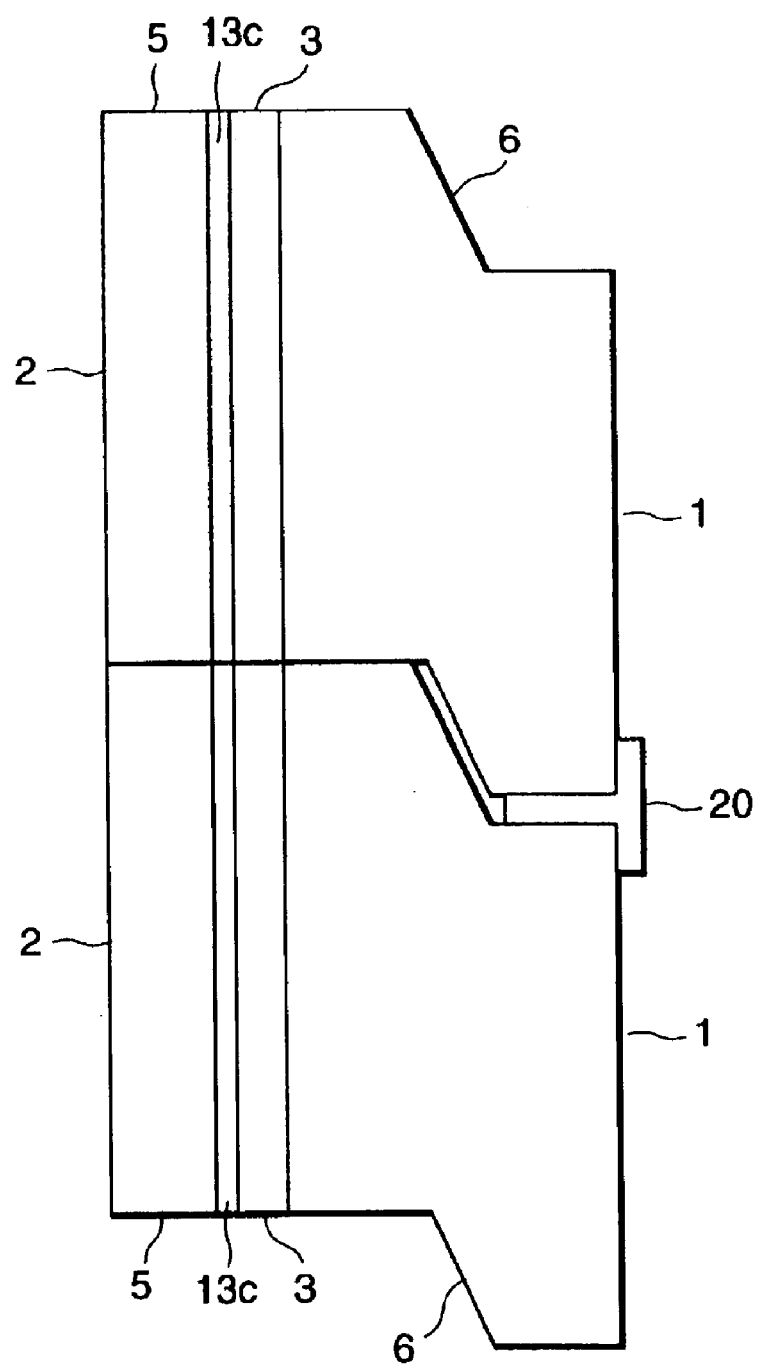
FIG. 4 is a drawing showing a stack of two projection devices according to the present invention.

FIGS. 1 to 4 show a first embodiment of the present invention. FIG. 1 is an exploded perspective view of a projection device 1 according to the first embodiment. FIG. 2 is a side section of the projection device 1. FIG. 3 is a perspective view of a screen frame 3 of the projection device 1. FIG. 4 is a drawing showing a stack of two projection devices 1.

As shown in FIG. 2, the projection device 1 is provided with a screen 2, the screen frame 3, a double-side adhesive tape 4, a single-side adhesive tape 5, a housing 6, and an image projector 7.

The screen 2 has a screen panel 8 and a reinforcing panel 9. Furthermore, the screen panel 8 comprises a light-transmissive Fresnel lens 10 and a light-transmissive lenticular lens 11 both made of PMMA (polymethyl methacrylate) resin. The reinforcing panel 9 is made of, e.g., light-transmissive acrylic resin, and having a plane narrower than the screen panel 8. The reinforcing panel 9 is put on the screen panel 8 for increasing the mechanical strength of the screen 2. Then the screen panel 8 serves as a front panel of the screen 2. On the other hand, the reinforcing panel 9 serves as a back panel of the screen 2.

As shown in FIG. 3, the screen frame 3 is comprised of a rectangular main frame 12 and four frame pieces 13a to 13d, which are shaped in a two-level step. A number of bolts 14 are mounted on the inner surface of the main frame 12 by welding or the like so as that they protrude from the inner surface. On the other hand, the frame pieces 13a to 13d are defined undercuts 15 around their edges in correspondence with the bolts 14. The frame pieces 13a to 13d are fit on the main frame 12 by engaging the undercuts 15 with the bolts 14 on the main frame 12, and then secured to the main frame 12 by screwing nuts 16 on the bolts 14. Here, each of the frame pieces 13a to 13d is attached on the corresponding periphery edge of the screen 12 before they are secured to the main frame 12.

That is, a black flexible double-side adhesive tape 4 is sandwiched between the reinforcing panel 9 having a narrow plane and serving as the back panel of the screen 2 and frame pieces 13a to 13d and thus uniting frame pieces 13a to 13d to the reinforcing panel 9. Moreover, a black thin flexible single-side adhesive tape 5 is applied across the outer surfaces of the frame pieces 13a to 13d and the peripheral edges of the screen panel 8 having a wide plane and serving as the front panel of the screen 2, i.e., a stack of a Fresnel lens 10 and a lenticular lens 11. In this way, the frame pieces 13a to 13d attached to the screen 2 are secured to the main frame 12, and thus the screen 2 is held by the screen frame 3.

As shown in FIG. 1, the housing 6 is shaped in a box defined with an opening 6A in front of the box and accommodating an inclined reflector 17 in the inner part of the box. The image projector 7 is accommodated in the inner bottom part 6B of the housing 6, as shown in FIG. 2. Moreover, counter-engaging members 18 are provided on the inner wall of the opening 6A.

On the other hand, engaging members 19 are provided on the inner surface of side panels 3A of the screen frame 3. By engaging the engaging members 19 with the counter-engaging members 18 of the housing 6, the screen frame 3 is fit in the opening 6A so as that the lenticular lens 11 serving as the front panel of the screen 2 exposes from the opening 6A.

The image projector 7 has a light source such as a mercury lamp for projecting light therefrom to a liquid crystal panel. The light is then converted into a light carrying image information in the liquid crystal panel. The image information carrying light is reflected by the reflector 17 and then projected to the back of the screen 2, as shown in FIG. 2. Consequently, an image is displayed on the screen 2.

In the screen 2, the front panel thereof is united to outer surfaces of the frame pieces 13a to 13d by the single-side adhesive tape 5, as shown in FIG. 2. On the other hand, residual panels on the back of the screen 2 are united to the inner surface of the frame pieces 13a to 13d through the double-side adhesive tape 4. Consequently, the screen 2 is reliably secured to the screen frame 3. As a result, a burden of the single-side adhesive tape 5 for holding the screen 2 is alleviated. Therefore, a wrinkle and a peeling-off of the single-side adhesive tape 5 become hard to occur, and thus the screen 2 is reliably held by the screen frame 3.

In this embodiment, as shown in FIG. 2, the plane of the screen panel 8 is formed on a par with the plane of the screen frame 3. Therefore, even in a large-screen display apparatus wherein a plurality of the projection devices 1 are stacked in a matrix array by links 20, as shown in FIG. 4, joints of the screens become hard to be visible. Consequently, the large-screen display apparatus can display a comfortable image.

Figure 5:
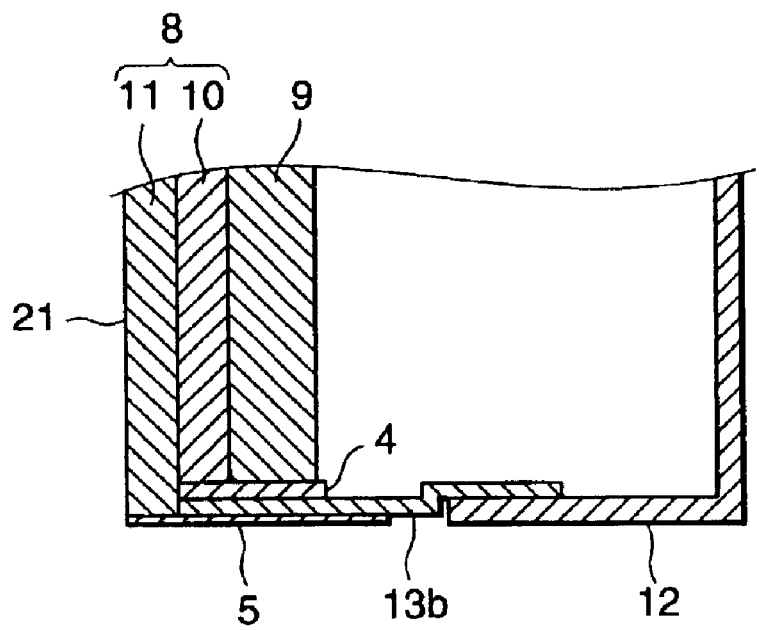
FIG. 5 is a side section showing a screen according to one aspect of the present invention.
Figure 6:
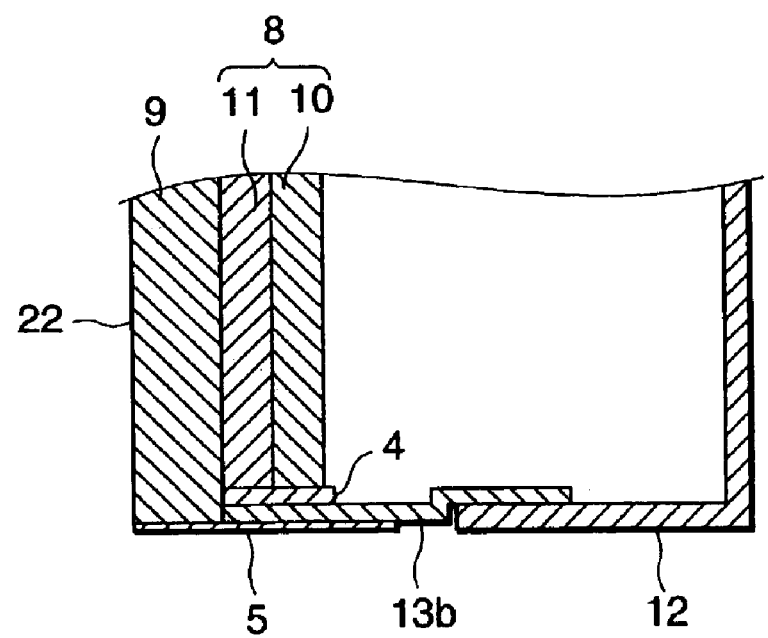
FIG. 6 is a side section showing a screen according to another aspect of the present invention.

Referring now to FIGS. 5 and 6, a second and a third embodiments will be demonstrated. In addition, the same elements as those shown in FIGS. 1 to 3, are assigned with the same marks and omitted the explanation.

In the second embodiment, as shown in FIG. 5, the lenticular lens 11 constituting the screen panel serves as the front panel of the screen 21. The lenticular lens 11 has a plane wider than the residual panels of the screen 21, i.e., the Fresnel lens 10 and the reinforcing panel 9. The periphery edges of the Fresnel lens 10 and the reinforcing panel 9 are united to the inner surfaces of the frame pieces 13a to 13d by the double-side adhesive tape 4. On the other hand, the peripheral edge of the lenticular lens 11 is united to the outer surfaces of the frame pieces 13a to 13d by the single-side adhesive tape 5. Consequently, the screen 21 is securely held by the screen frame 3.

In the third embodiment, as shown in FIG. 6, the reinforcing panel 9 serves as the front panel of the screen 22. The reinforcing panel 9 has a plane wider than the residual panels of the screen 22, i.e., the lenticular lens 11 and the Fresnel lens 10. The peripheral edges of the Fresnel lens 10 and the lenticular lens 11 are united to the inner surfaces of the frame pieces 13a to 13d by the double-side adhesive tape 4. On the other hand, the peripheral edge of the reinforcing panel 9 is united to the outer surfaces of the frame pieces 13a to 13d by the single-side adhesive tape 5. Consequently, the screen 22 is securely held by the screen frame 3.

In these embodiments, two panels on the back of the screen are secured to the inner surface of the screen frame 3 by the double-side adhesive tape 4. As a result, a burden of the single-side adhesive tape 5 for holding the screen 21, 22 is alleviated. Therefore, a wrinkle and a peeling-off of the single-side adhesive tape 5 become hard to occur, and thus the screen 21, 22 is reliably held by the screen frame 3.

Figure 7:
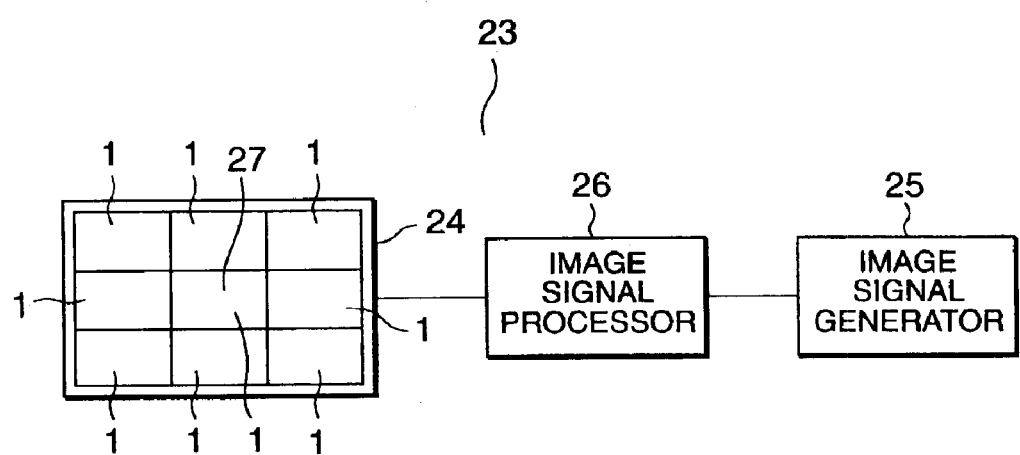
FIG. 7 is a block diagram showing a large-screen display apparatus according to the present invention.
Figure 8:
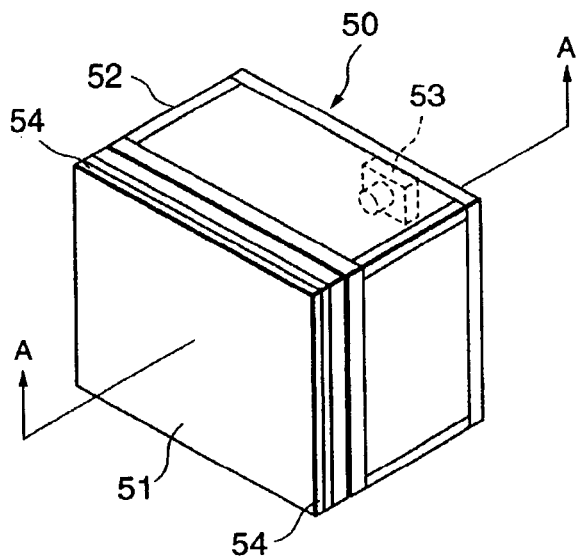
FIG. 8 is an external perspective appearance of a conventional back projection type.
Figure 9:
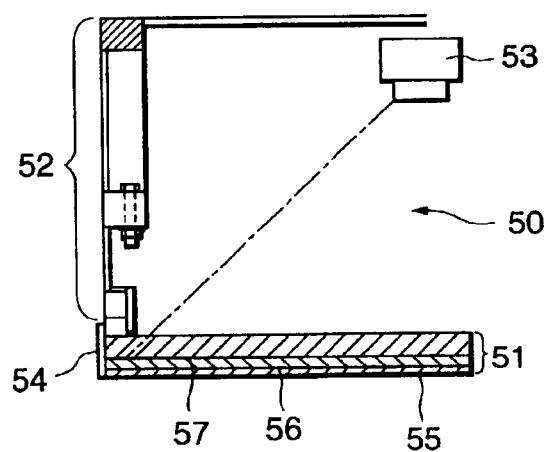
FIG. 9 is a section taken along the line A—A of FIG. 8.

Referring now to FIG. 7, a third embodiment of the present invention will be described. Here, the same elements as those shown in FIG. 1, are assigned with the same marks and omitted the explanation.

The third embodiment relates in particular to a large-screen display apparatus 23.

The large-screen display apparatus 23, as shown in FIG. 7, comprises a multi-screen projection apparatus 24, an image signal generator 25, and an image signal processor 26. In the multi-screen projection apparatus 24, a plurality of projection devices 1 as defined in the preceding embodiments are stacked in a matrix-array.

Therefore, a large size multi-screen 27 is formed by the stack of the screens 2 of the projection devices 1 on the front of the multi-screen projection apparatus 24.

The image signal generator 25 is constituted to generate an image to be displayed on the large size multi-screen 27.

The image signal processor 26 is constituted to divide the image generated by the image signal generator 25 so as that the divided image signals are applied to a plurality of the projection devices 1. As a result, the image is displayed on the large size multi-screen 27 of the multi-screen projection apparatus 24.

Since in each of the projection devices 1 the thin single-side adhesive tape 5 unites the peripheral edge of the front panel of the screen 2 and the outer surface of the screen frame 3, the joints of the screens 2 are minimized in thickness. Therefore, the joints of the screens 2 become hard to be visible, and thus the large multi-screen 27 can display a comfortable image.

According to the one aspect of the present invention, the screen in the projection device is securely held by the screen frame. Moreover, a burden of the single-side adhesive tape 5 for holding the screen 2 is alleviated. Therefore, a wrinkle and a peeling-off of the single-side adhesive tape 5 become hard to occur. Consequently, the screen 2 is reliably held by the screen frame 3. That is, the screen 2 is prevented its coming-off from the screen frame 3. Moreover, when the projection devices are stacked with each other, the gap between their screens can be made small.

According to the other aspect of the present invention, joints of the screens arrayed in matrix in the large-screen display apparatus become hard to be visible. Therefore, the large-screen display apparatus can display a comfortable image.

As described above, the present invention can provide an extremely preferable projection device and a large-screen display apparatus using the same.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A projection device, comprising:
   a screen having a layered structure comprising a light-transmissive screen panel and a light-transmissive reinforcing panel, wherein a front panel in the screen has a plane wider than residual panels on the back of the screen;
   an image projector configured to project an image on the screen;
   a screen frame, fit on the peripheral edges of the residual back panels, having a plane smaller than the front panel such that the screen frame is arranged behind the front panel so as not to extend from the peripheral edges of the front panel;
   a double-side adhesive tape sandwiched between residual back panels and the screen frame for uniting them together so that the peripheral edges of the front panel and the outer surface of the screen frame are aligned in a plane;
   a single-side adhesive tape applied across the peripheral edges of the front panel and the outer surface of the screen frame for uniting them together; and
   a housing configured to accommodate the image projector and to hold, at its opening, the screen via the screen frame so that the front panel of the screen is exposed to the outside.

2. A projection device according to claim 1, wherein the screen panel serves as the front panel.

3. A projection device according to claim 1, wherein the screen panel comprises a Fresnel lens and a lenticular lens, and wherein one of the Fresnel lens and lenticular lens serves as the front panel.

4. A projection device according to claim 1, wherein the reinforcing panel serves as the front panel.

5. A large-screen display apparatus, comprising:
   (a) a multi-screen projection apparatus having a matrix array comprising a plurality of projection devices, each of the projection devices comprising:
      (i) a screen having a layered structure comprising a light-transmissive screen panel and a light-transmissive reinforcing panel, wherein a front panel in the screen has a plane wider than residual panels on the back of the screen;
      (ii) an image projector configured to project an image on the screen;
      (iii) a screen frame, fit on the peripheral edges of the residual back panels, having a plane smaller than the front panel such that the screen frame is covered behind the front panel;
      (iv) a double-side adhesive tape sandwiched between residual back panels and the screen frame for uniting them together so that the peripheral edges of the front panel and the outer surface of the screen frame are aligned in a plane;
(v) a single-side adhesive tape applied across the peripheral edges of the front panel and the outer surface of the screen frame for uniting them together; and
(vi) a housing configured to accommodate the image projector and to hold, at its opening, the screen via the screen frame so that the front panel of the screen is exposed to the outside;
(b) an image signal generator configured to generate image signals to be displayed on a screen of the multi-screen projection apparatus; and
(c) an image signal processor configured to divide the image signal generated by the image signal generator so that the divided image signals are applied to a plurality of the projection devices.

6. The display apparatus of claim 5, wherein the screen panel of the projection devices serves as the front panel.

7. The display apparatus of claim 5, wherein the screen panel of the projection devices comprises a Fresnel lens and a lenticular lens, and wherein one of the Fresnel lens and lenticular lens serves as the front panel.

8. The display apparatus of claim 5, wherein the reinforcing panel of the projection devices serves as the front panel.

* * * * *